United States Patent [19]

Yurek et al.

[11] Patent Number: 5,140,154

[45] Date of Patent: Aug. 18, 1992

[54] INLINE FIBER OPTIC SENSOR ARRAYS WITH DELAY ELEMENTS COUPLED BETWEEN SENSOR UNITS

[75] Inventors: Aileen M. Yurek, Alexandria; Anthony Dandridge, Burke; Alan D. Kersey, Springfield, all of Va.

[73] Assignee: The United States of America as represented by the Secretary of the Navy, Washington, D.C.

[21] Appl. No.: 641,843

[22] Filed: Jan. 16, 1991

[51] Int. Cl.$^5$ .............................................. G01B 9/02
[52] U.S. Cl. .......................... 250/227.12; 250/227.21; 250/227.27; 356/345
[58] Field of Search ..................... 250/227.12, 227.14, 250/227.15, 227.16, 227.17, 227.18, 227.19, 227.21, 227.27, 227.28; 356/345; 355/12, 13; 367/79, 130, 140, 149

[56] References Cited

U.S. PATENT DOCUMENTS

| | | | |
|---|---|---|---|
| 4,193,130 | 3/1980 | Young et al. | 367/149 |
| 4,545,253 | 10/1985 | Avicola | 367/140 |
| 4,547,869 | 10/1985 | Savit | 367/130 |
| 4,570,248 | 2/1986 | Assard | 367/149 |
| 4,593,385 | 6/1986 | Chamuel | 367/149 |
| 4,697,926 | 10/1987 | Youngquist et al. | 250/227.12 |
| 4,699,513 | 10/1987 | Brooks et al. | 250/227.19 |
| 4,755,668 | 7/1988 | Davis | 250/227.27 |
| 4,770,535 | 9/1988 | Kim et al. | 250/227.27 |
| 4,775,216 | 10/1988 | Layton | 250/227.12 |
| 4,848,906 | 7/1989 | Layton | 356/345 |
| 4,870,269 | 9/1989 | Jeunhomme et al. | 250/227.12 |
| 4,889,986 | 12/1989 | Kersey et al. | 356/345 |
| 5,051,965 | 9/1991 | Poorman | 367/149 |

Primary Examiner—David C. Nelms
Assistant Examiner—John R. Lee
Attorney, Agent, or Firm—Thomas E. McDonnell; George Jameson

[57] ABSTRACT

An improved inline fiber optic sensor array is achieved by packaging a plurality of fiber optic sensor units such that each fiber optic sensor unit incorporates a complete functional sensor and adjacent fiber optic sensor units are separated by a delay element connected in series between each pair of fiber optic sensor units. Delay elements temporally separate measureand signals received from the individual fiber optic sensor units and permit decoupling of signals produced in response to environmental stress on the non-sensor unit portions of the array.

15 Claims, 5 Drawing Sheets

INLINE FIBER OPTIC SENSOR ARRAYS WITH DELAY ELEMENTS COUPLED BETWEEN SENSOR UNITS

FIELD OF THE INVENTION

The present invention relates generally to fiber optic sensors. More specifically, the present invention relates to inline time division multiplexed fiber optic interferometric sensor arrays having reduced signal content due to environmental stresses.

BACKGROUND OF THE INVENTION

FIG. 1A shows a typical fiber optic sensor 1 for use in an inline time division multiplexed (pulsed) array. Sensor comprises a fiber optic sensor coil 10 and a reference line 12, each formed from an optical fiber cable generally denoted 22, disposed between a pair of couplers generally denoted 14. Typically the reference line 12 is physically isolated from perturbation by external factors. Each coupler 14 typically is a fiber optic coupler and has two input ports and two output ports. A pulsed coherent light source 18 supplies a series of light pulses to sensor 1. To interrogate sensor 1, a compensating interferometer or compensating sensor 26 is required between the output of sensor 1 and a photodetector 20.

Alternatively, as shown in FIG. 1B, a sensor 1' comprises a coil 10 coupled between a first output port of a coupler 14 and a discrete reflector or mirror 24a. A second reflector or mirror 24b is coupled to the second output port of coupler 14. Reflectors 24a and 24b are full reflectors reflecting all of the impinging coherent light. The configuration of FIG. 1B is functionally identical to that of FIG. 1A.

An illustrative example of sensor 1 operation will now be discussed with reference to FIG. 1A. During operation, coherent light source 18 is coupled to both coil 10 and reference line 12 via coupler 14a and a fiber cable 22a. Sensor 1 responds to a measurand, such as acoustic waves impinging on sensor coil 10, by changing the length of the coil 10 as a function of the magnitude of such measurand. The compensating interferometer 26 is responsive to the optical output of coherent light produced by coil 10 for developing an optical interference pattern, which is detected by a photodetector 20. Photodetector 20 generates an electrical signal in response to the optical interference pattern, thereby providing an electrical signal representative of the impinging acoustic wave.

The use of a plurality of fiber optic acoustic sensors as described hereinabove in an inline array of such sensors is also known. As illustrated in FIGS. 2A-2D, a plurality of sensors 1 and 1' (FIGS. 1A and 1B) are combinable in various series arrangements to form inline fiber optic acoustic sensor arrays 2 through 5, respectively. FIG. 2A shows a Fabry-Perot array 2 formed from a plurality of sensors 1'. Coupler 14 and reflector 24b of sensor 1' (FIG. 1B) are replaced by a partial reflector 24', as shown, thereby reducing the number of elements needed to form an inline array of sensors 1'. FIG. 2B shows a tapped serial array 3 formed by a plurality of sensors 1 as disclosed in U.S. Pat. No. 4,889,986. FIG. 2C shows a Stanford ladder array 4 produced by an alternative configuration of sensor 1, while FIG. 2D shows an inline Michelson array 5 produced by an alternative configuration of sensor 1'. It will be appreciated that a complete sensor is defined between each adjacent pair (set in the case of a Stanford ladder array) of couplers or reflectors.

Fiber cables 22 employed in forming sensing coils 10 are sensitive to a large number of environmental effects, such as temperature fluctuations and pressure variations. It is known to provide a compensating interferometer 26, having the configuration of sensor 1 in FIG. 1A, in each of the arrays 2 through 5 to compensate for the path differences of individual sensors 1 and 1' in the arrays 2 through 5.

Referring to FIGS. 3A-3D, in accordance with conventional techniques for packaging arrays 2 through 5 into deployable assemblies, repeating segments of each array are packaged as identical sensor units 30 located along each array 2 through 5, respectively. For example, as shown in FIG. 4 with respect to array 3 of FIG. 3B, each sensor unit 30 in an inline array is conventionally formed by mounting together a sensing coil 10 wrapped on or embedded in a compliant medium 11, a reference line 12 and one of the couplers 14 (reflectors 24' in the case of the FIG. 3A array) associated with a given sensor 30. A housing 40 can be provided which encloses the sensing coil 10, reference line 12 and the associated coupler 14. A perforated aluminum tube from 5-10 inches long and approximately 1½ inches in diameter is commonly used as housing 40. A potting medium (not shown) is used to secure reference line 12 and the coupler 14 within housing 40. Alternatively, instead of providing a separate housing for each sensing unit, the entire array is typically disposed within a protective hose or other tubular member 23 for deployment. Thus, each sensor unit 30 so packaged contains only a portion of a complete functional sensor (sensor 1 shown in FIG. 1A for the FIG. 3B array, and sensor 1' shown in FIG. 1B for the FIG. 3A array).

The arrays 2-5 shown in FIGS. 3A-3D, respectively, are all used with conventional signal processing circuitry such as that disclosed in U.S. Pat. No. 4,889,986, wherein sensor responses are determined based on the travel time of coherent light pulses through each sensor of a sensor array. However, as noted above, inline sensor arrays 2-5 with sensor unit packaging as shown in FIGS. 3A-3D do not include clearly defined sensors.

In addition, the required spacing between sensor units 30 in the arrays 2-5 necessitates long leads on coils 10 and reference lines 12. This further complicates measurement of the signals of interest from sensors 1, 1', because environmental stresses produced in the portions of fiber cables 22 connecting the sensor units to each other are indistinguishable from the stresses produced within the sensor units in response to the acoustic pressure waves of interest.

Heretofore, an improved inline sensor array which decouples environmental stress in the portions of fiber cables 22 connecting the sensor units to each other in the array has not been achieved.

SUMMARY OF THE INVENTION

An object of the invention is to provide an improved inline fiber optic sensor array which decouples environmental stress and thereby provides improved sensor signal-to-noise ratio.

These and other objects and advantages are achieved in accordance with the present invention by packaging an inline fiber optic acoustic sensor array, the array comprising first and second fiber optic sensor units for sensing a desired measurand connected in a linear array, such that each sensor unit incorporates a complete functional sensor, and the two sensor units are separated from each other by an intermediate delay element responsive both to the desired measurand and to environmental stress connected between the first and second sensors for providing time separation between desired measurand signals produced by the first and second sensor units and signals produced by the array in response to environmental stress impinging on the delay element.

According to one aspect of the present invention, each fiber optic sensor produces a modulated coherent light beam in response to an impinging desired measurand. The delay element produces a modulated coherent light beam in response to both an impinging desired measurand and environmental stresses. Modulated coherent light beams produced by each fiber optic sensor are time separated from modulated coherent light beams produced by the adjacent delay element. Conventional time discriminating signal processing techniques are used to interrogate only the sensor units, or to otherwise eliminate electrical signals corresponding to the modulated coherent light beam produced by the delay element, thus decoupling environmental stresses from the electrical signals being processed.

BRIEF DESCRIPTION OF THE DRAWINGS

These and other objects, features and advantages of the invention are disclosed in or apparent from the following detailed description of preferred embodiments. The preferred embodiments are described with reference to the drawing, in which like elements are denoted by like reference numbers, and in which.

DETAILED DESCRIPTION OF THE PREFERRED EMBODIMENTS

Although the invention will be described in terms of a fiber optic hydrophone application, any inline, time division multiplexed fiber optic array sensing a measurand, such as a magnetic field, temperature, pressure or an electric field, is also within the purview of the invention.

Figure 1A:
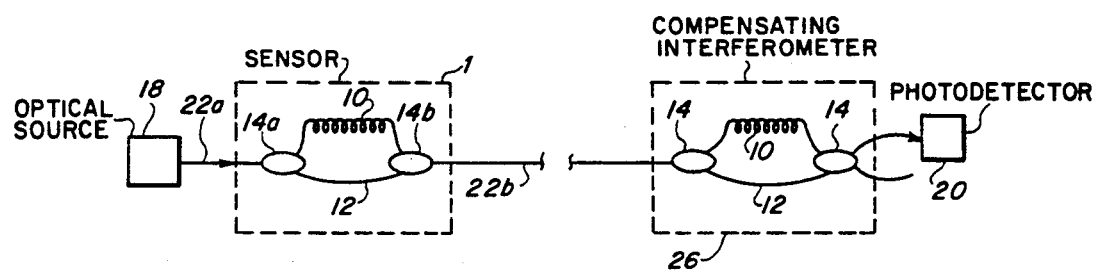
FIGS. 1A and 1B diagrammatically show illustrative examples of alternative conventional arrangements of fiber optic acoustic sensors.
Figure 1B:
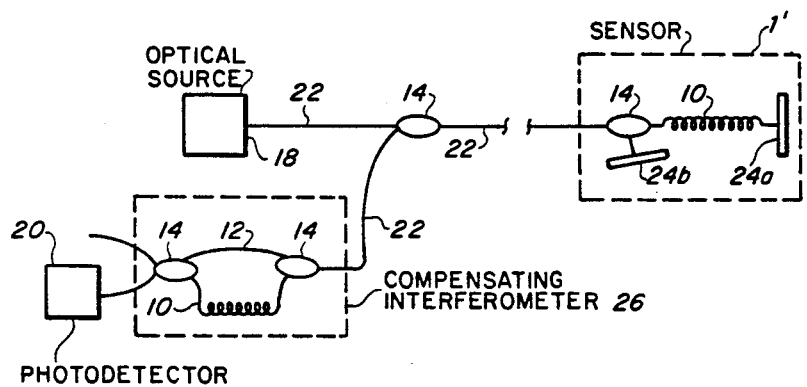
Figure 2A:
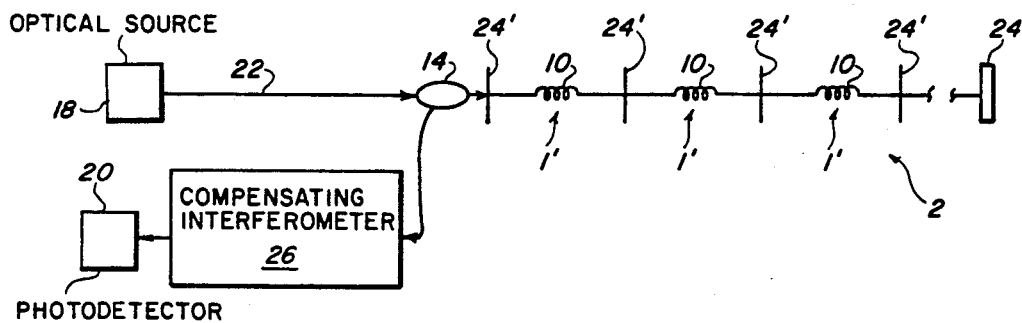
FIGS. 2A-2D diagrammatically show illustrative examples of alternative arrangements of conventional inline sensor arrays formed with the sensors shown in FIGS. 1A and 1B.
Figure 2B:
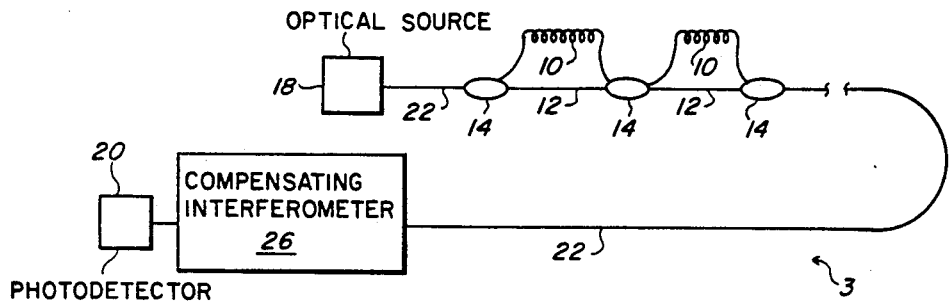
Figure 2C:
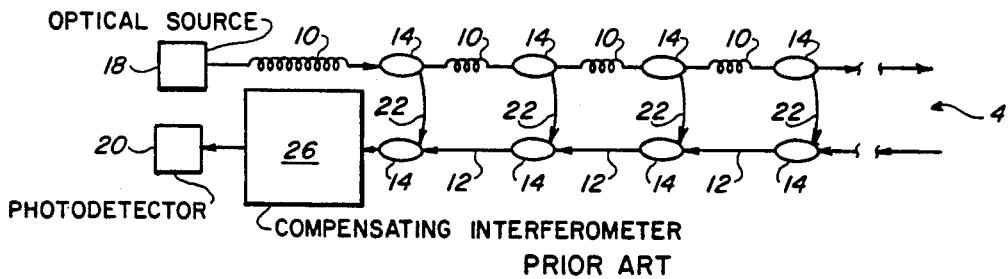
Figure 2D:
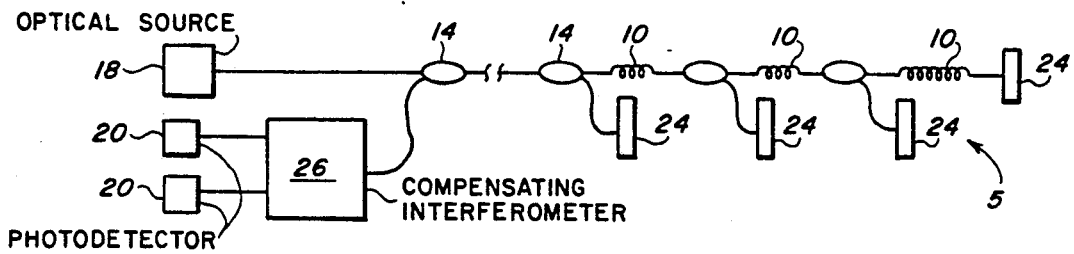
Figure 3A:
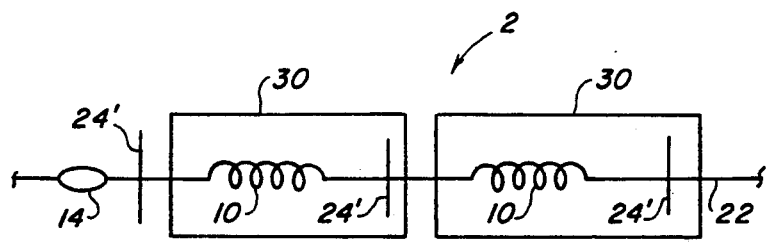
FIGS. 3A-3D diagrammatically show conventional packaging of the inline acoustic sensor arrays shown in FIGS. 2A-2D.
Figure 3B:
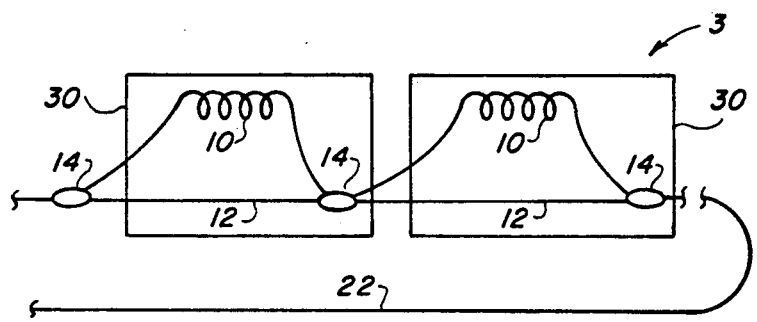
Figure 3C:
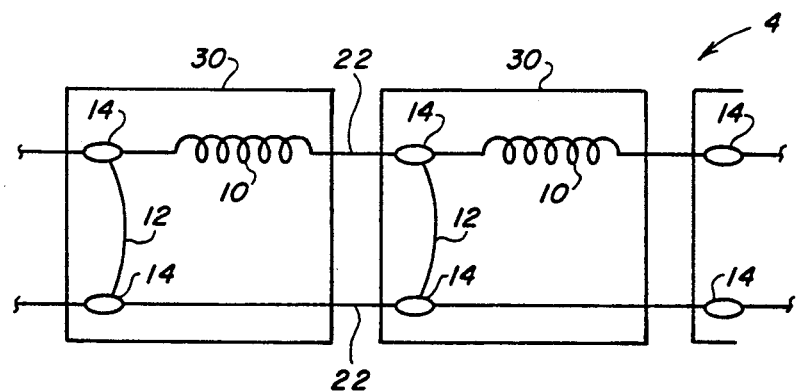
Figure 3D:
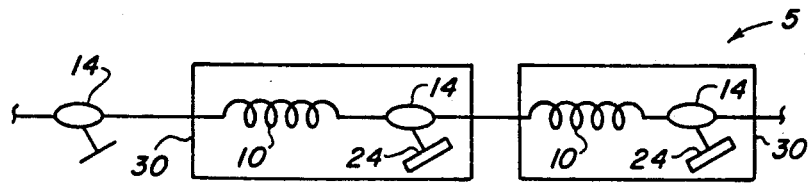
Figure 4:
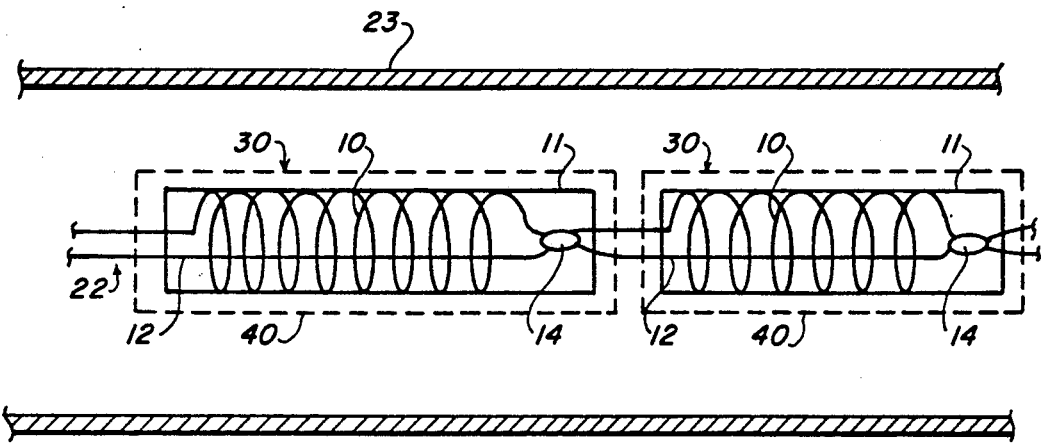
FIG. 4 is a partly diagrammatic more detailed sectional side view of a conventional packaging arrangement for a sensing unit in the inline acoustic sensor array shown in FIG. 3B.
Figure 5:
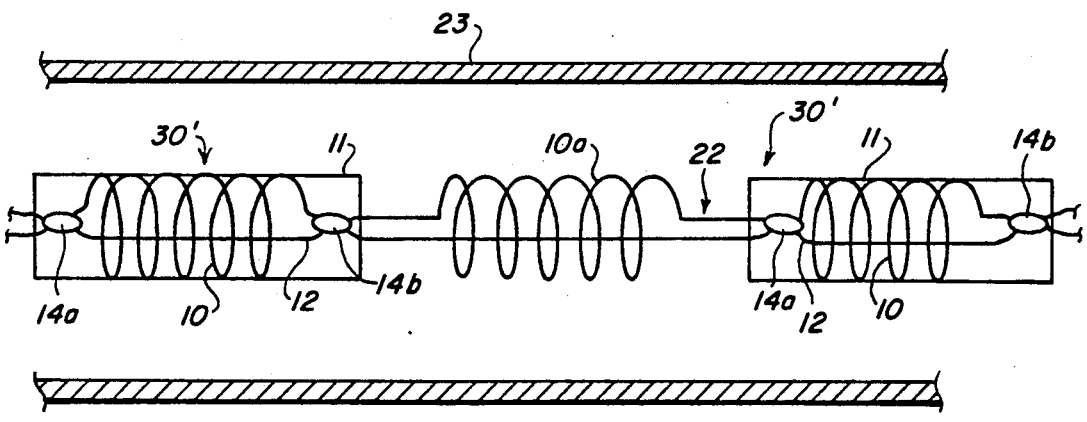
FIG. 5 is a partly diagrammatic sectional side view of a fiber optic sensor packaged according to the present invention.

Referring to FIG. 5, a fiber optic sensor 1 packaged as a sensor unit 30' in accordance with a preferred embodiment of the present invention comprises a coil 10 wrapped on or embedded in a compliant medium 11, reference line 12, and a pair of couplers 14a and 14b all mounted together. Each sensor unit 30' is thus a complete functional sensor 1. Sensor units 30' are connected in an inline array with an intermediate delay element 10a coupled between adjacent sensor units 30' by optical fiber cables 22. A fiber optic coil advantageously comprises delay element 10a, as shown. It will be appreciated that coherent light travelling from a first sensor unit 30' to a second sensor unit 30' through coil 10a is separated in time by the time required for a coherent light beam to travel through coil 10a. For protection, the entire array, including delay elements 10a, is enclosed within, for example, a hose 23.

Figure 6A:
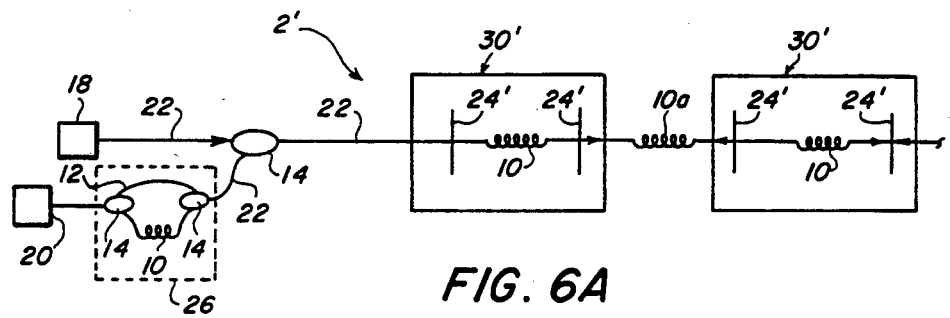
FIGS. 6A-6D are illustrative examples of preferred embodiments of inline sensor arrays packaged in accordance with the present invention.

Referring to FIGS. 6A-6D, inline arrays 2'-5' corresponding to the arrays 2-5 shown in FIG. 3A-3D, but packaged according to the present invention, will now be described. Referring specifically to FIG. 6A, sensor array 2' comprises a series of sensor units 30' incorporating complete sensors 1' each separated by a coil delay element 10a. Thus, array 2' is formed from a plurality of fiber optic sensors 1' having adjacent pairs of sensors 1' serially coupled by a delay element 10a.

Figure 6B:
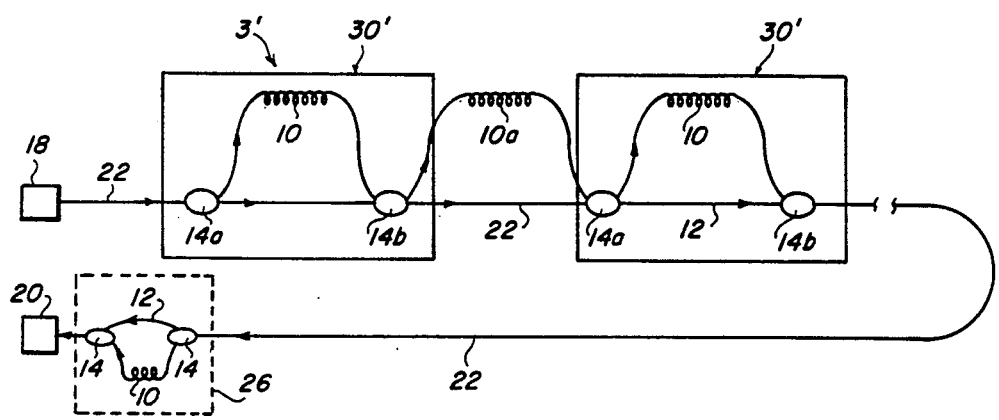
Figure 6C:
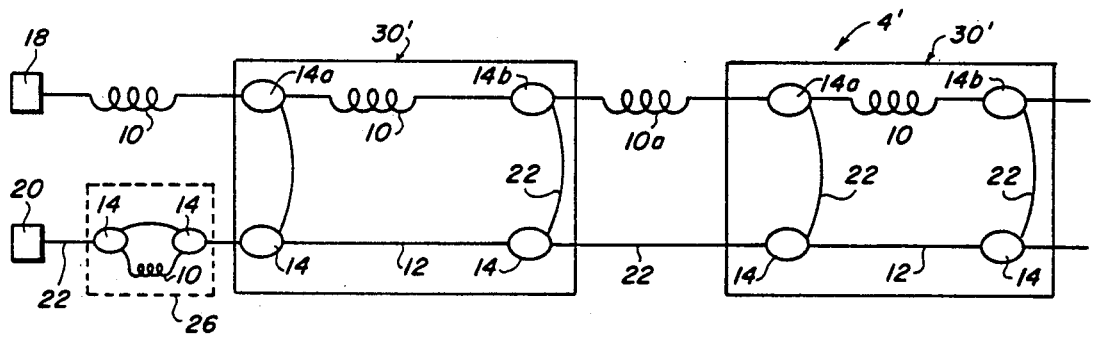

Referring to FIGS. 6B and 6C, sensor arrays 3' and 4', respectively, comprise a plurality of linearly connected sensor units 30' incorporating complete sensors 1 each separated by a delay element 10a, and connected in parallel with a fiber cable 22 terminating in compensating interferometer 26, as shown. Thus, arrays 3' and 4' are both formed from a plurality of fiber optic sensors 1 with each adjacent pair of sensors 1 separated by one delay element 10a.

Figure 6D:
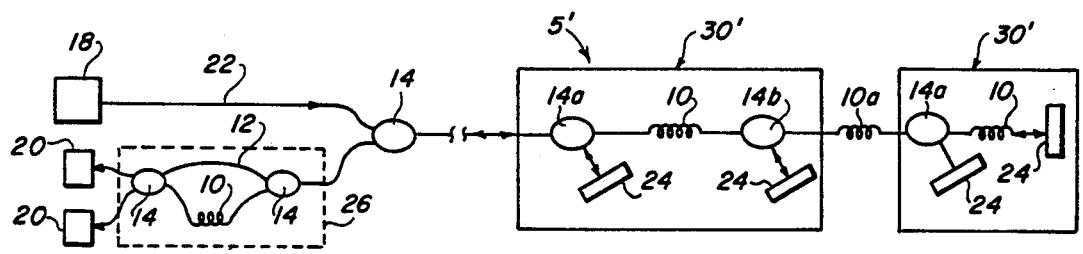

Referring to FIG. 6D, sensor array 5' similarly comprises a series of sensor units 30' incorporating complete sensors 1' serially connected by intermediate delay elements 10a.

The arrangement of complete sensors 1 or 1' separated by delay elements 10a as shown in FIGS. 6A-6D increases the signal-to-noise ratio of the array 3' by decoupling each sensor 1, 1' from induced environmental stresses. Sensors 1, 1' in each array produce modulated coherent light beams in response to impinging acoustic pressure waves. Delay element 10a produces modulated coherent light beams in response to impinging acoustic pressure waves and environmental stress on the array. The modulated coherent light beams produced by sensors 1, 1' are time separated from modulated coherent light beams produced by delay element 10a. Conventional time discriminating signal processing techniques can thus be readily used to separate signals corresponding to modulated coherent light beams produced in sensors 1, 1' of arrays 2'-5' in response to impinging acoustic pressure waves from signals corresponding to acoustic pressure waves and environmental stress produced in other parts of the arrays. Thus the output of an array 3' in accordance with the present invention can be processed so as to effectively only interrogate the sensor portions of the array.

Referring to array 3' shown in FIG. 6B, an illustrative example will now be described wherein coil 10 in each complete sensor 1 and delay element 10a are each formed from a fiber cable 22 one hundred meters long. In the illustrative case, it is assumed that a coherent light beam has a velocity of 1 kilometer per 5 microseconds ($\mu$sec) in fiber cable 22 and, thus, the coherent light beam travels though each coil 10, and delay element 10a, in 0.5 $\mu$sec. Thus, a coherent light beam traveling from a first sensor 1 to a second sensor 1 via delay element 60 is time separated by 0.5 $\mu$sec. Conventional signal processing, based on the known time separation between sensors 1, processes signals corresponding to modulated coherent light beams produced by sensors 1 but does not process signals corresponding to modulated coherent light beams produced by delay element 10a. Thus, environmental stresses which are coupled to array 3' in delay element 10a are decoupled from sensors 1.

The array gain (AG) for a generalized array is given as AG=10×log N×SNR, where N is the number of sensors employed in the array and SNR is the conventional signal-to-noise ratio for the best sensor in the array. For sensors 1 and 1' packaged according to the present invention, decoupling environmental stresses provides an overall improvement in SNR for each sensor 1, 1' and, thus, provides an overall increase in AG for arrays 2'-5' over inline sensor array 2-5 having equivalent numbers of sensors 1, 1'.

Other modifications and variations to the invention will be apparent to those skilled in the art from the foregoing disclosure and teachings. Thus, while only certain embodiments of the invention have been specifically described herein, is will be apparent that numerous modifications may be made thereto without departing from the spirit and scope of the invention.

What is claimed is:

1. An inline fiber optic sensor array for use in deployable or towed array systems, said inline fiber optic sensor array comprising:
    a plurality of sensor units coupled in a linear array, each of said sensor units incorporating a complete functional fiber optic sensor for sensing a desired measurand; and
    a plurality of delay elements respectively coupled between associated adjacent ones of said sensor units, each said delay element being responsive both to the desired measurand and to environmental stress for providing time separation between desired measurand signals produced by associated said adjacent sensor units and signals produced by said array in response to environmental stress impinging on said delay element.

2. The inline fiber optic sensor array of claim 1 wherein each said fiber optic sensor includes:
    a fiber optic coil having first and second ends;
    a reference line having first and second ends;
    a first coupler operatively connected to said first end of said coil and said first end of said reference line; and
    a second coupler operatively connected to second end of said coil and said second end of said reference line.

3. The inline fiber optic sensor array of claim 1 wherein each said fiber optic sensor includes:
    first and second reflectors; and
    a fiber optic coil serially connected between said first and second reflectors.

4. The inline fiber optic sensor array of claim 1 wherein each said fiber optic sensor includes:
    first and second pairs of couplers;
    a fiber optic coil disposed between said first pair of couplers;
    a reference line disposed between said second pair of couplers; and
    a plurality of fiber optic cables for operatively coupling said fiber optic coil and said reference line in parallel between said first and second pairs of couplers.

5. The inline fiber optic sensor array of claim 1 wherein each said fiber optic sensor includes:
    first and second couplers:
    a fiber optic coil serially coupled between said first and second couplers; and
    first and second reflectors operatively coupled to said first and second couplers, respectively.

6. An inline fiber optic sensor array for use in deployable or towed array systems, said inline fiber optic sensor array comprising:
    first and second sensor units, each incorporating a complete functional fiber optic sensor for sensing a desired measurand connected in a linear array, and
    a delay element coupled between said first and second sensor units and being responsive both to the desired measurand and to environmental stress for providing time separation between desired measurand signals produced by said first and second sensor units and signals produced by said array in response to environmental stress impinging on said delay element.

7. The inline fiber optic sensor array of claim 6 wherein:
    each of said sensor units is separately enclosed in a housing.

8. The inline fiber optic sensor array of claim 6 further including:
    protective means for enclosing the entire array.

9. The inline fiber optic sensor array of claim 6 wherein each said fiber optic sensor includes:
    a fiber optic coil having first and second ends;
    a reference line having first and second ends;
    a first coupler operatively connected to said first end of said coil and said first end of said reference line; and
    a second coupler operatively connected to said second end of said coil and said second end of said reference line.

10. The inline fiber optic sensor array of claim 6 wherein each said fiber optic sensor includes:
    first and second reflectors; and
    a fiber optic coil serially connected between said first and second reflectors.

11. The inline fiber optic sensor array of claim 6 wherein each said fiber optic sensor includes:
    first and second pairs of couplers;
    a fiber optic coil disposed between said second pair of couplers;
    a reference line disposed between said second pair of couplers; and
    a plurality of fiber optic cables for operatively coupling said fiber optic coil and said reference line in parallel between said first and second pairs of couplers.

12. The inline fiber optic sensor array of claim 6 wherein each said fiber optic sensor includes:
    first and second couplers:
    a fiber optic coil serially coupled between said first and second couplers; and
    first and second reflectors operatively coupled to said first and second couplers, respectively.

13. The inline fiber optic sensor array of claim 6 wherein:
    said delay element comprises a fiber optic coil.

14. The inline fiber optic sensor array of claim 6 further comprising:
    a compensating interferometer means for providing an output from said array.

15. The inline fiber optic sensor array of claim 14 wherein said compensating interferometer means includes:
- a fiber optic coil;
- a reference line disposed optically parallel to said fiber optic coil; and
- a pair of first and second couplers with said fiber optic coil and said reference line connected therebetween, said first coupler having an input port connected to an end of said linear array, and said second coupler having an output port connected to photodetector means.

* * * * *